US005968176A

United States Patent [19]
Nessett et al.

[11] Patent Number: 5,968,176
[45] Date of Patent: Oct. 19, 1999

[54] MULTILAYER FIREWALL SYSTEM

[75] Inventors: Danny M. Nessett, Fremont; William Paul Sherer, Sunnyvale, both of Calif.

[73] Assignee: 3Com Corporation, Santa Clara, Calif.

[21] Appl. No.: 08/865,482

[22] Filed: May 29, 1997

[51] Int. Cl.$^6$ ............................................. G06F 11/00
[52] U.S. Cl. ............................................. 713/201
[58] Field of Search ............................ 395/187.01, 188.01, 395/186, 200.59, 200.53, 683; 380/23, 25

[56] References Cited

U.S. PATENT DOCUMENTS

| | | | |
|---|---|---|---|
| 4,881,263 | 11/1989 | Herbison et al. | 380/21 |
| 5,577,209 | 11/1996 | Boyle et al. | 395/200.06 |
| 5,606,668 | 2/1997 | Shwed | 395/200.11 |
| 5,740,375 | 4/1998 | Dunne et al. | 395/200.68 |
| 5,828,893 | 10/1998 | Wied | 395/800 |

OTHER PUBLICATIONS

Blaze, et al., "Decentralized Trust Management", IEEE Conference on Security and Privacy, May 1996.
Simon, et al., "Adage: An Architecture for Distributed Authorization", OSF Research Institute,pp. 1–108, Dec.2, 1996.
Weissman, C., "Blacker: Security for the DDN Examples of A1 Security Engineering Trades", IEEE Symposium on Research and Privacy, pp. 286–292 (1992).
Cobra Security, "The Administrator's Interfaces", Cobra Security, pp. 135–159.
Check Point Software Technologies Ltd., "Security Platform Strategy", www.checkpoint.com (1997).
Instruction Manual, "Firewall–1; Managing Firewall–1 Using the OpenLook GUI", User Guide Version 2.1, pp. 1.1–1.19.
Check Point Software Technologies Ltd. "'Write Once, Manage Everything' Functionality to Enterprise Security Management", http://www.checkpoint.com, Oct. 1997.
Check Point Software Technologies Ltd., "Open Security Manager Data Sheet", http://www.checkpoint.com, 1998.
Guttman, Joshua D., "Filtering Postures: Local Enforcement for Global Policies", Paper No. 1081–6011/97, IEEE, from the Proceedings of the 1997 IEEE Symposium on Security and Privacy, Oakland, CA, May 4–7, 1997, pp. 120–129.
"User's Guide: PC Firewall for Windows 3.1x, Windows 95, and Windows NT", McAfee, Inc., Santa Clara, California, Oct. 1996, pp. 1–24.

*Primary Examiner*—Ly V. Hua
*Assistant Examiner*—Scott Baderman
*Attorney, Agent, or Firm*—Kent R. Richardson; Wilson, Sonsini, Goodrich & Rosati

[57] ABSTRACT

A system provides for establishing security in a network that include nodes having security functions operating in multiple protocol layers. Multiple network devices, such as remote access equipment, routers, switches, repeaters and network cards having security functions are configured to contribute to implementation of distributed firewall functions in the network. By distributing firewall functionality throughout many layers of the network in a variety of network devices, a pervasive firewall is implemented. The pervasive, multilayer firewall includes a policy definition component that accepts policy data that defines how the firewall should behave. The policy definition component can be a centralized component, or a component that is distributed over the network. The multilayer firewall also includes a collection of network devices that are used to enforce the defined policy. The security functions operating in this collection of network devices across multiple protocol layers are coordinated by the policy definition component so that particular devices enforce that part of the policy pertinent to their part of the network.

70 Claims, 7 Drawing Sheets

MULTILAYER FIREWALL SYSTEM

BACKGROUND OF THE INVENTION

1. Field of the Invention

The present invention relates to establishing and enforcing security functions in a network; and more particularly to systems for establishing security functions in a plurality of protocol layers to establish a multilayer firewall in a network.

2. Description of Related Art

Security is an increasingly important issue for network users, both inside enterprises operating so called intranets, and for world wide global data networks. Substantial technology has been developed for the purposes of securing networks. The security features which have been developed include at least the following product categories: (1) filtering, (2) access control, (3) protected communications, (4) security assist, and (5) security policy management.

Filtering involves the dropping or transforming of packets or frames based on values within their headers or within their data. Access control involves deciding whether a user or a user initiated communication should be given access to a particular computing resource. Protected communications refers to the processes ensuring that control information or data has not been modified nor read by unauthorized individuals. Security assist product types provide support in a network device for securing other parts of the system. Security policy management refers to managing the data that defines the security policies in the network.

These kinds of security features are enforced in current systems in particular network devices. Network devices at which security is implemented in addition to traditional terminals and end systems include devices such as the following: (1) network interface cards (NICs) and modems, (2) repeaters, (3) switches, (4) routers, (5) remote access equipment, which includes line servers, packet servers and access servers, and (6) network management systems. Although products exist that provide for establishing security in particular product families, systems which take advantage of products in all the various categories of devices found in networks, require substantial administration. In a network involving a wide variety of network intermediate devices and terminals, an administrator is required to manage the establishment of security policy at all the various levels of protocol, and in all the various systems.

For example, in one prior art system it is possible to establish a configuration referred to as a virtual local area network (VLAN). By configuring the VLAN, membership in the group is controlled. For example, port number, medium access control address, layer-three protocol type, layer-three address, and user defined criteria that match patterns in layer-three packets can be utilized to define VLAN membership in such devices. Similar pattern matching may involve protocol data at layers 3 through 7, for example. Other systems support per-call filtering in remote access systems. This allows customers to permit or deny various kinds of traffic on a user by user basis. A wide variety of other security systems are available in the market.

However, the variety of security features, and the various devices and levels of protocol at which they operate, present a significant administration problem to users of the security features. Because of the complexity, it is difficult to establish a coordinated security policy across all layers, and device types of the network, and particularly difficult to maintain such a system even if it could be successfully implemented.

Furthermore, as networks evolve, older equipment, often referred to as legacy systems, remain that may not be able to participate in a particular security function. A security function which is added to a network, therefore may not be able to successfully penetrate the entire network. Alternatively, the presence of legacy systems in the network further complicates the coordination and implementation of a security system.

Traditionally, firewalls are implemented as border equipment, such as routers and application proxy gateways that protect a private network from external attack. However, it is likely that between 50% and 85% of losses by corporations are the result of insider attacks, for example by disgruntled or opportunistic employees. Consequently, a major security requirement of corporation intranets is protection against internal attacks.

In addition, the economics of modern corporate business increasingly requires companies to outsource work or partner with other companies. Since information technology permeates the day to day conduct of business in the modern corporation, such outsourcing and partnering invariably requires companies to share information with each other using electronic means. It is rare that this information is available in equipment isolated from that holding the rest of the company's information assets. Consequently outsourcing and partnering require a corporation to grant other companies access to parts of its intranet. Furthermore, each outsourcing or partnering arrangement usually involves different subsidiaries or divisions of the corporation. This means the percentage of a corporation's information assets accessible by at least one outside concern becomes fairly large.

The traditional border firewall is largely unsuited to meet the security requirements arising from these two concerns, that is arising from insider threats and widespread external sharing of data. Border firewalls are completely unsuitable to address insider threats. They are meant to keep external intruders from attacking the corporation intranet, but have no ability to prevent insiders from doing so.

In order to accommodate outside access of corporate information, "holes" must be made in border firewalls to allow the necessary information flow. In extreme cases, divisions may simply bypass corporate firewalls altogether and provide direct connections to outsourcing and partnering companies or their employees.

One approach to satisfying these requirements is to break up the corporation intranet into several pieces and place border firewalls between them. This approach has value, but introduces bottlenecks to the corporation intranet. That is internal firewalls adversely affect performance within the company. As the partitioning becomes finer grained, access to resources outside of the firewall partition experiences increasingly degraded performance.

Another approach to this problem is to distribute firewall functionality down into lower layers of the protocol hierarchy. So for example, if network interface cards, repeaters and switches perform some firewall packet filtering work, routers which traditionally do packet filtering are relieved of significant processing and therefore can provide better performance for a given cost. In addition, distributing the firewall provides better scaling opportunities. That is as the network grows, the resources available to perform filtering naturally grow as well. This prevents the emergence of choke points, such as those that might occur in internal border firewalls.

Typically in the prior art, firewall functionality, like packet filtering, is placed in single nodes, or groups of similar nodes with the same firewall rules. These nodes tend to be deployed at the borders of networks to protect the network from attacks from outside the network. However, this approach does not scale well as a network expands. Further it provides a very coarse granularity of control for the network security. A variety of different approaches that are possible to implement make it hard to understand how separate systems interact in the network. Furthermore, these individual systems, when adapted to protect from unauthorized activity inside a network, typically cause significant performance problems. (See, for example, "Building Internet Firewalls", by Chapman, et al., O'Reilly & Associates, September 1995; "Internet Firewalls and Security", 3Com Technical Report, 1996 by Semeria.)

Accordingly, it is desirable to implement a system which allows for a coordinated security policy implementation across multiple layers of network systems.

SUMMARY

The present invention provides a system for providing security in a network that includes nodes operating in multiple protocol layers and having security functions. Multiple network devices, such as routers, remote access equipment, switches, repeaters and network cards, and end system processes having security functions are configured to contribute to implementation of distributed firewall functions in the network. By distributing firewall functionality of the network in a variety of network devices and end systems, a pervasive firewall is implemented. The pervasive, multilayer firewall includes a policy definition component that accepts policy data that defines how the firewall should behave. The policy definition component can be a centralized component, or a component that is distributed over the network. The multilayer firewall also includes a collection of network devices that are used to enforce the defined policy. The security functions operating in this collection of network devices across multiple protocol layers are coordinated by the policy definition component so that particular devices enforce that part of the policy pertinent to their part of the network.

For example, a router in the network enforces that part of the policy that is pertinent to those systems and network devices whose traffic might traverse the router. A switch enforces that part of the policy that is pertinent to those systems and network devices whose traffic traverses the switch. A repeater enforces that part of the policy that is pertinent to those systems and network devices whose traffic traverses the repeater. A network interface card enforces that part of the policy that is pertinent to the system or device to which it is connected. In addition, other parts of the network are included in the multilayer firewall, such as end system operating systems and applications, remote access equipment network management systems for controlling network traffic and monitoring network traffic, and other auxiliary systems such as name services and file services included in the collection of network devices at which the pervasive, multilayer firewall of the present invention is implemented.

The present invention provides coordinated access control, cooperative protected communications features, and overall security policy management at multiple network devices and end systems. A security administrator is provided with a convenient and clear control system that allows management of the security properties of the network. Further, the invention enables reductions in unnecessary redundancy in security services, meets significant customer requirements in the area of legacy system support, offers cost efficiency and provides complexity reduction.

Thus the present invention can be characterized according to one aspect as a system that provides security in a network including nodes. Nodes in a set of the nodes in the network include security functions operating in one or multiple protocol layers, and execute such security functions in response to configuration data having formats adapted for the respective types of nodes. The system includes a topology data store, that stores information about security functions operating in the set of nodes in the network, and about interconnection of nodes in the network. A configuration interface is coupled to the topology data store. The interface includes an input by which to receive security policy statements indicating security policies to be implemented among nodes in the network. A configuration driver is coupled to the network, the configuration interface and the topology data store. The configuration driver includes resources which translate the security policy statements into configuration data in the formats needed for nodes in the network, and which send the configuration data to the nodes using the communication channels available for the respective nodes.

According to various aspects of the invention, the nodes execute multiple protocol layers, including a medium access control MAC layer, and the set of nodes includes nodes that provide MAC layer filtering according to filter parameters. The configuration data includes filter parameters for the MAC layer filtering. In another aspect, the multiple protocol layers include a network layer, such as an Internet Protocol IP layer. The set of nodes according to this aspect includes nodes providing network layer filtering according to filter parameters. The configuration data includes filter parameters for the network layer filtering in such nodes. According to another aspect, the multiple protocol layers include a transport layer function, such as the Transport Control Protocol TCP operating over the Internet Protocol IP. According to this aspect, the configuration driver includes resources that translate security policy statements into configuration data for the transport layer functions, such as filtering, application layer functions such as filitering, and /or for functions in higher layers of the protocol stack. Such higher layer functions include for example authentication protocols, authorization protocols, auditing protocols and other security functions. A variety of devices executing filtering, access control, protected communications and security assist features are distributed in the network infrastructure, and managed in a coordinated fashion according to the present invention.

According to other aspects of the invention, the configuration interface includes a script interpreter which interprets a script language to determine security policy statements. The script language can be input by a keyboard, or by a graphical user interface. In support of the script language, the topology data store includes data indicating active nodes in the network which are capable of enforcing a security policy, and passive nodes which are incapable of enforcing, or not trusted to enforce, a security policy. In addition, the topology data store includes data indicating nodes coupled to network links to nodes external to the set of nodes within the security framework. The security policy statements indicate security policy for end systems. Active nodes, passive nodes, and nodes that are coupled to network links to nodes external to the secured network are configured to carry out the policy. According to another aspect of the invention, the script language includes a syntax for specifying a security policy statement including a source identifier for a source node or a source group, a destination identifier for a destination node or a destination group, a communication activity identifier, and a rule for the identified communication activity between the identified source and the identified destination. According to one aspect of the invention, the syntax further includes an identifier of the location (i.e., source, destination, both source and destination, or intermediate node) at which the rule is to be enforced.

According to yet another aspect of the invention, the security policy statements indicate security policies for communication between a source set including one or more end stations in the network, and a destination set including one or more end stations in the network. The configuration driver includes resources to identify a cut vertex set of nodes capable of enforcing the indicated security policies within the set of nodes in the network, and to establish the configuration data in nodes in the cut vertex set, where the cut vertex set consists of active nodes which if removed from the network would isolate the source set from the destination set. In an optimized embodiment, the cut vertex set consists of a minimal cut vertex set.

According to yet other aspects of the invention, the configuration driver includes resources to enforce security policies for passive nodes by generating configuration data for active nodes that are linked to the passive nodes. Also, the resources in the configuration driver identify security policy statements which cannot be enforced according to the data in the topology store.

The topology data store in one preferred aspect includes data structures that provide information about particular nodes in the set of nodes that fall within the security framework. The data structures include information such as network layer addresses, MAC layer addresses, higher layer user identifiers, transport layer port and socket numbers, whether or not a particular node is trusted to enforce security policy, the type of security policy that the node is able to enforce, the constructs used to enforce policy, the format of configuration data required for the security constructs, and the connections of the node to other nodes in the network.

According to yet another aspect of the invention, a configuration driver generates configuration data for security functions distributed in the network. The configuration data is stored in a configuration store that has persistent storage capability and which is in communication with the particular node in the set of nodes to which the configuration data relates. The configuration store for some devices in the network is included in the device itself, for example in the form of programmable nonvolatile memory. In alternative systems, the configuration store is provided at a node in the network other than the node at which the policy is enforced, and coupled to that particular node at which the policy is enforced by a communication link. According to this aspect of the invention, the configuration driver transmits updated configuration data to the configuration store, and follows that with a notification to the node at which the security function is executed that the configuration in the store has been updated. The node then reads the updated configuration data and begins executing the updated policy.

The present invention can also be characterized more generally as a method for establishing a firewall system in a network. The method includes providing topology data including information about security functions operating in nodes in the network, and about interconnection of nodes in the network. Next, the method includes providing security policy statements including security policies to be implemented among or between end systems in the secured network, using formats and communication channels matched to the type or types of nodes involved. Next, the method involves translating in response to the topology data, the security policy statements into configuration data for security functions operating in the network. Finally, the method includes establishing the configuration data in the security functions at the active nodes in the network, using formats and communication channels matched to the various type or types of nodes. The multiple layers of protocol at which the security functions operate in one alternative include at least two protocol layers, for example at least two of the data link layer, network layer, transport layer, and applications or equivalents thereof.

Accordingly, the present invention takes advantage of security functions placed in network interface cards, in switches, in routers, and in remote access systems, and provides a system administrator the opportunity to move firewall functionality out to the variety of devices in the networks to create a pervasive, multilayer firewall. Security features can be distributed in multiple layers to multiple devices, and managed using a coherent security policy management interface that provides a security administrator convenient and clear control over the security properties of the network. The distributed functionality, and convenient and clear control allow scaling advantages for firewalls that now exist only for systems such as distributed remote monitoring dRMON, or other sophisticated network systems that are directed to single purpose functions.

As the number increases of networking devices containing security policy data, like filtering rules and protected communications infrastructure information sets, providing coherent and coordinated management of that data becomes increasingly important. The present invention provides a coherent approach to management and distribution of security policy enforcement data in a diverse multilayer network.

Other aspects and advantages of the present invention can be seen upon review of the figures, the detailed description and the claims which follow.

DETAILED DESCRIPTION

Figure 1:
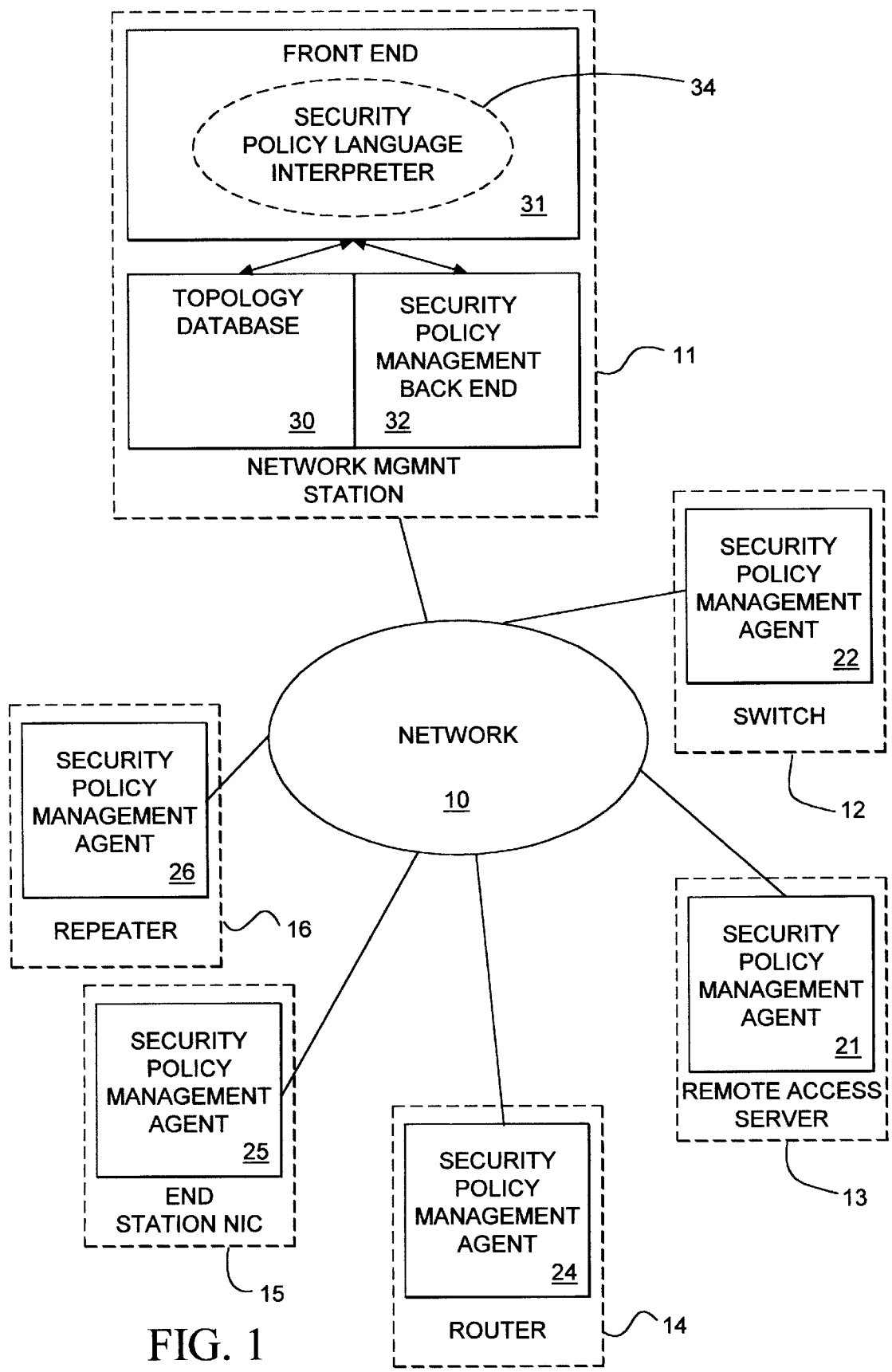
FIG. 1 provides a simplified diagram of a network including a multilayer firewall system according to the present invention.

A detailed description of the present invention is provided with respect to FIGS. 1 through 5, in which FIG. 1 provides an overview.

FIG. 1, a network 10 includes a plurality of nodes. At least one node in the network comprises a network management station 11 or other security policy server. Other nodes in equipment 13, a router witch 12, a remote access equipment 13, a router 14, an end station including a network interface card and its supporting driver software 15, and a repeater 16. Thus, a variety of network devices are included in the network 10. The switch 12, remote access equipment 13, router 14, end station network interface card 15, and repeater 16 all include security policy management agents 22, 23, 24, 25 and 26 respectively. Security policy management agents 22–26 execute security functions at a variety of protocol layers. Depending upon the protocol layers traversed in the particular network device in which the agent is implemented and other architectural features, the constructs used by the security functions vary from device type to device type.

In the embodiment shown in FIG. 1, the network management station 11 includes a topology data store 30, a configuration interface front end 31, and security policy management back end 32 providing configuration driver. The topology data store 30 stores information about security functions executed by the security policy management agents 22–26 operating in multiple protocol layers at nodes in the network. Also, the topology database indicates the interconnections of nodes in the network.

The configuration interface front end 31 is coupled with the topology database 30. It includes inputs by which to receive security policy statements, such as by providing a script in a security policy language, which is interpreted by an interpreter 34 to provide security policy statements. The security policy management back end 32 is coupled to the configuration interface front end 31 and to the topology database 30, and includes resources that translate the security policy statements into configuration data for nodes in the network. The security policy management back end 32 provides a configuration driver that establishes the configuration data to the security policy management agents 22–26 at nodes in the network in which the security policy statements are to be enforced.

The configuration interface front end 31 includes in one embodiment a text input device by which a security policy language script is input to the system. In alternative approaches, the configuration system interface front end 31 includes a graphical user interface by which the user specifies the security policy statements. In either approach, a security policy script is provided having a syntax that allows translation of the security policy statement into configuration data for the appropriate protocol level and device type of the node in the network at which the policy is enforced.

Security Policy Language and Security Policy Language Front End

The Security Policy Language is used to specify constraints on activity within a network. Such activity includes activity conducted by both network devices such as repeaters, switches, routers, remote access equipment, etc., and by end systems in the network. The multilayer firewall can be implemented with any security policy language suitable for a particular installation, but one example language is set forth below.

Each end system and active network device has one or more network addresses associated with its security policy management agent, and is connected to one or more other network devices. This information is obtained by the security policy language front end through interactions with a system administrator as well as from the topology data base. Interactions with a system administrator may occur through a user interface or through the reading of files or other storage resources such as Domain Name System (DNS), Network Information Service (NIS) or other data bases. End systems are differentiated from network devices in that they are always leaves in the graph formed from the topology data base. The generic term "node" refers to either end systems or network devices. End systems (aka hosts) are the nodes identified in policy statements. A special case occurs, for example, when a network device is accessed for management purposes. In this case the network device acts in the role of an end system.

End systems in the network may belong to groups. Groups are named and their membership is established by input to the security policy language front end by a system administrator or otherwise, or in an alternative implemented in the topology data base. Again, this input can occur either by user interface interactions or by the security policy language front end reading files or other data bases. Groups of end systems may be specified as containing individual end systems or other groups of end systems. Finally, nodes that are connected across communication links to other nodes that are external to the network to which security is applied are noted in the topology data base. In one example implementation, the syntax provides for a special "virtual" node named "external" which represents end systems outside the management domain of the multilayer firewall. Thus, the topology indicates whether a particular node in the topology is coupled to the special node "external". In alternatives, there is the possibility of more than one named external node. This allows the multiple layer firewall to define policy for communications with more than one other external multiple layer firewall.

The security policy language front end preferably also manages or serves as the front end to specify other information, such as user identifiers, groups of user identifiers, time specifications for a length of time access to a destination is allowed by a source, specifications of time intervals during which access to a destination is allowed, and so forth.

The security policy language itself is used to write a set of security policy statements that specify the allowed activity between end systems in the network. An illustrative rule base and syntax looks like the following:

| Source | Destination | Activity | Policy Statement | Enforced At |
|---|---|---|---|---|
| Host 1 | Host 2 | FTP | Allow for employee "John Doe" and "Jane Deer" between the hours of 5am-7pm on Monday-Friday | Destination |
| Host 3 | Host Group1 | Telnet | Disallow | Destination |
| Host Group1 | Host Group2 | Real Audio | Allow 5pm-8am Monday-Friday | Both |
| Host Group2 | Host 1 | HTTP | Allow; audit | Destination |
| External | Host or Host Group | HTTP | Allow | Source |
| Host or Host Group | External | FTP | Allow | Source |

Topology Information Data Base

The topology information data base contains information about the nodes and how they are interconnected. Information specific to a node includes in one example its network address or addresses, its MAC address or addresses, its allowed associated user identifiers, its port or socket numbers, whether or not it is trusted to enforce security policy, what type of enforcement rules it is capable of enforcing, the formats of security constructs in the node, and its interconnection among nodes in the network.

Information about how nodes are connected includes an identifier for each node or node network interface, and graph information that specifies which nodes are directly connected to which other nodes through which node interfaces. This information also includes nodes which are connected to the "external" node, or to another firewall system or another data structure indicating external connections. In one extension, the information identifies individual processes within the physical nodes.

The topology data base in one example is managed by a single data base management system, or alternatively constructed from multiple data bases managed by data base front end systems, at individual nodes or at collections of nodes. Examples of data in multiple databases include RMON and dRMON data, security information managed by end systems and network devices and connectivity information obtained by network management systems distributed through the network.

Security Policy Management Back End

The security policy management back end uses the information from the security policy front end configuration interface and the topology data base to create, store, update, distribute and enforce the security policy specified by the security policy statements. The back end consists of elements in stand alone management systems, in persistent storage systems and in nodes. Security policy management back end translates the rules specified in the security policy statements in a context of the information in the topology data base and creates node specific security policy configuration data that it distributes to the network nodes it has chosen. The security policy management back end decides how to partition the security policy statements into sets of configuration data enforceable at specific nodes, and transforms the rules of the security policy statements into node specific configuration data enforceable at the chosen nodes.

Node specific security policy configuration data includes static data, such as filtering rules that drive filtering engines in the node, or includes dynamic data like programs, for example Java, Source, or Bytecodes, as well as programs expressed in scripting languages such as TCL, Pearl, C-shell scripts. The format of the configuration data which expresses the security policy statement enforced at a particular node is a function of the particular node and its security policy enforcement agent.

In one alternative, the security policy management back end analyzes the security policy statements and topology data base information to drive device specific security policy configuration data according to the following process, assuming that the security policy statements are presented according to the syntax set forth above.

1. Nodes are divided into two categories: 1) passive nodes, which cannot enforce policy either because they are unable to do so or because they are not trusted to do so, and 2) active nodes that can enforce policy.

2. For each active node, create a list of all passive nodes that are either directly connected to it or for which a path exists from the passive node to the active node through other passive nodes. Each passive node on this list is called an associated node of the active node.

3. For each security policy rule, determine the set of source nodes (i.e., by recursively expanding all groups of nodes in the source set until the list contains only individual nodes) and the set of destination nodes (using the same decomposition algorithm except using nodes in the destination set rather than nodes in the source set).

4. For each security policy rule perform the following computation. For each passive node in the Source node set, determine if there is a path from it to any passive node in the Destination node set that does not traverse an active node. If so, signal that the rule cannot be enforced.

5. If the rule specifies it should be enforced at the Source:
   Determine the set of active nodes with associated nodes in the Source node set.
   For each of these active nodes, translate the security policy statement specified in the rule into security policy configuration data that the node can enforce, i.e., rules in its own security policy language.
   Establish these rules in the node, using node specific communication channels.

6. If the rule specifies it should be enforced at the Destination node set:
   do the same as in 5, except use the associated nodes in the Destination node set.

7. If the rule specifies it should be enforced at both the Source node set and the Destination node set:
   Do both 5 and 6.

Figure 2:
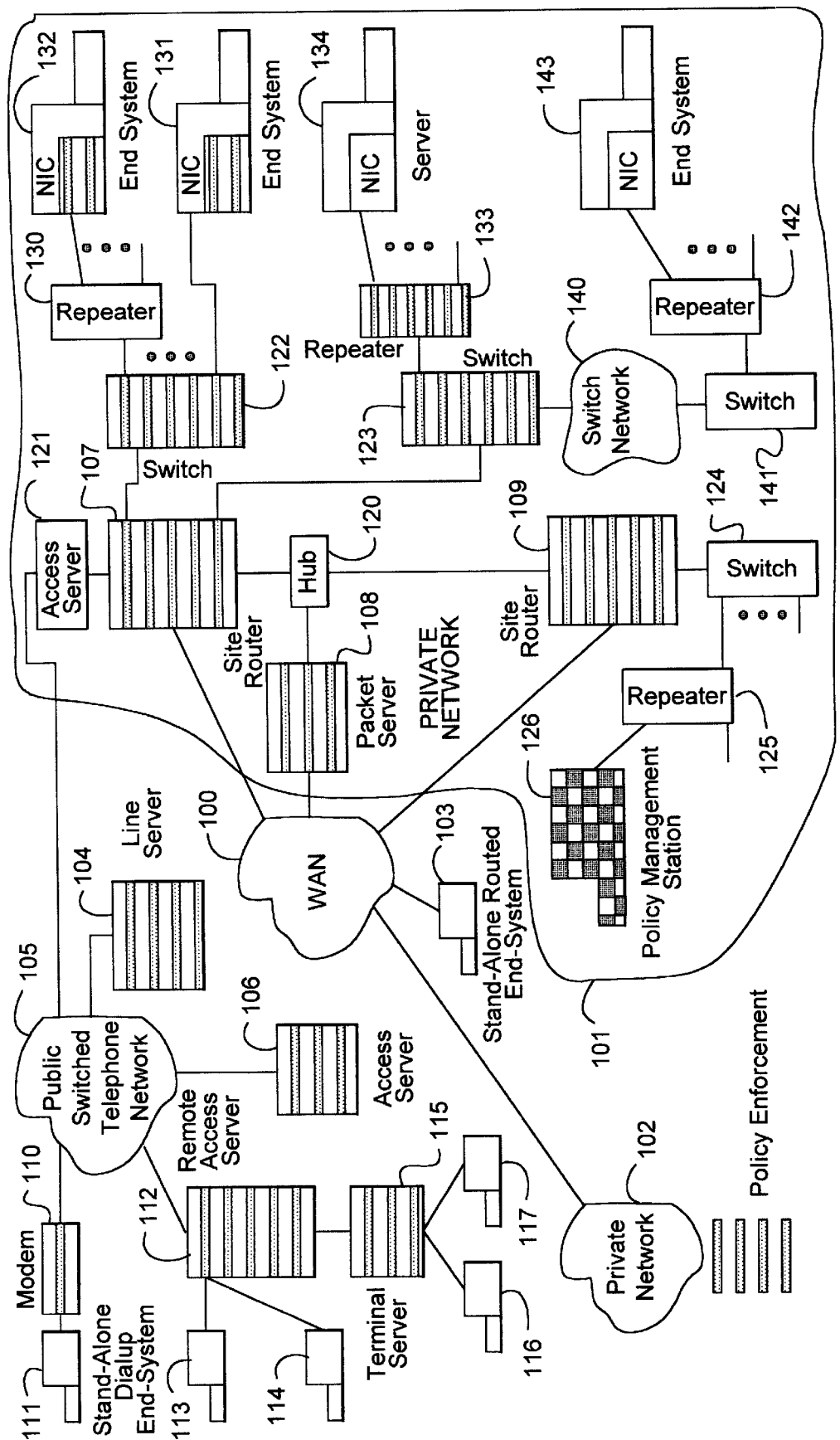
FIG. 2 is a diagram representative of a variety of network components involved in the multilayer firewall system of the present invention.
Figure 3:
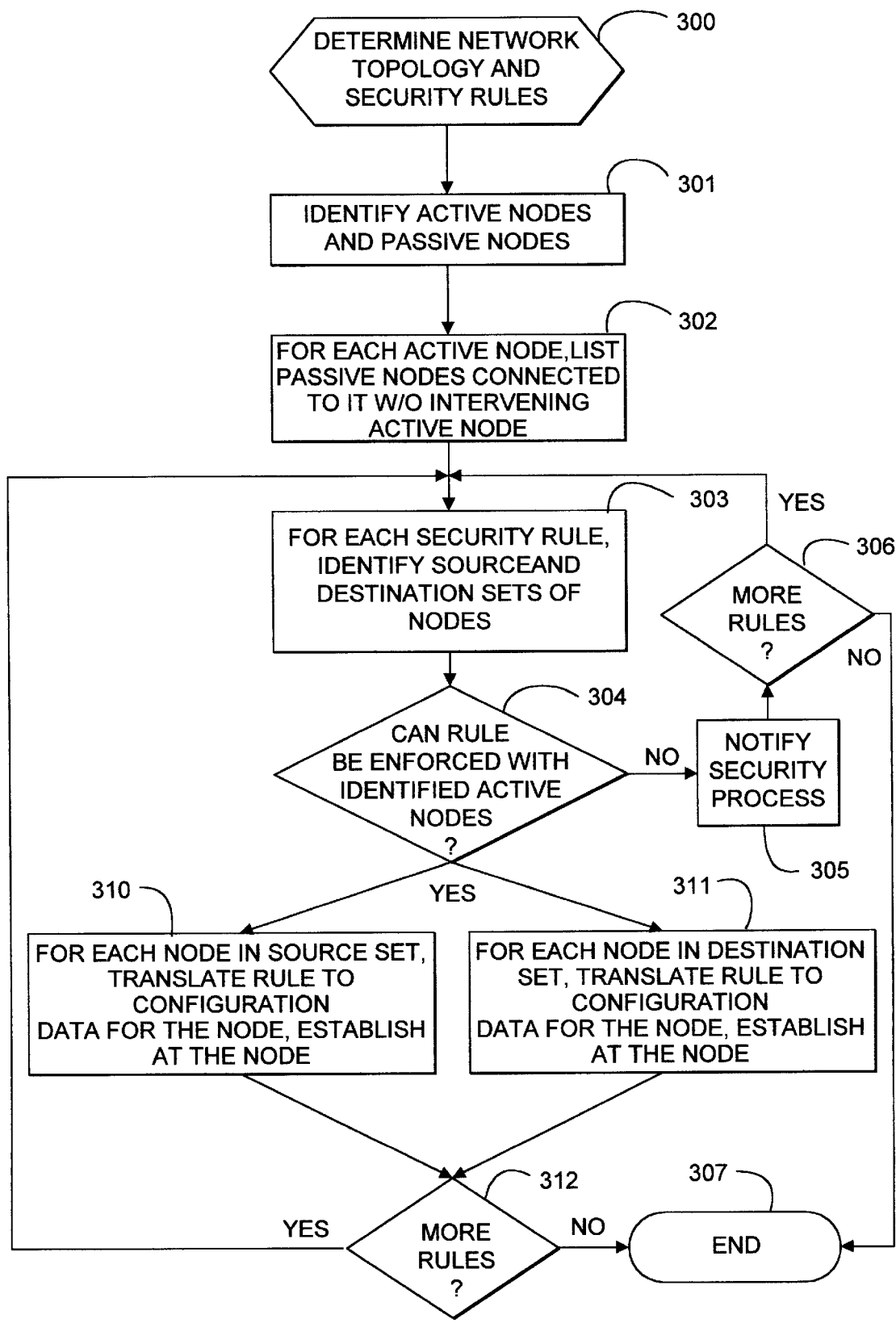
FIG. 3 is a flowchart illustrating the process of implementing a multilayer firewall according to the present invention.

The implementation of the security policy according to the rules set forth above can be better understood with respect to FIGS. 2 and 3, in which FIG. 2 provides a more detailed example of the components of a network in which security policy according to the present invention is enforced at multiple layers. FIG. 3 illustrates an overall flow chart for the implementation of the distributed multilayer firewall.

As can be seen in FIG. 2, a representative network includes a wide variety of network devices and end systems. Thus FIG. 2 shows a network including a set of nodes, where nodes in the set provide security functions at multiple protocol layers. The network includes a generic wide area network WAN facility 100. Wide area network 100 is coupled to a first private network 101 and a second private network 102. Components in the first private network 101 are illustrated in the figure while second private network 102 is represented by a cloud. The wide area network facility 100 is also coupled to a stand alone routed end system 103, a line server 104 which is coupled in turn to public switch telephone network (PSTN) 105, and an access server 106, which is also coupled to the PSTN 105. As illustrated in FIG. 2, the WAN facility 100 is connected to the private network 101 through a site router 107, a packet server 108, and another site router 109.

The PSTN 105 is connected through a modem 110 to a stand alone dial up end system 111. Also, the PSTN 105 is coupled to a remote access router 112. The remote access router 112 is connected to end systems 113 and 114. Also the remote access router 112 is connected to a terminal server 115, which in turn is connected to end systems 116 and 117.

In the first private network 101, the packet server 108 is connected to a hub 120 which provides repeater or switch functions in this example. The hub in turn is connected to site router 107 and to site router 109. Each of the site routers 107, 109 is also connected to the wide area network facility 100. Site router 107 is connected to an access server 121 which is connected to the PSTN 105. Also, site router 107 is connected to a set of switches, including switch 122 and switch 123. Site router 109 is connected to a switch 124. Switch 124 is connected to a set of repeaters, represented by repeater 125. Repeater 125 is connected to an end station 126 which includes the security policy management resources corresponding to node 11 in FIG. 1.

The private network 101 also includes a number of other devices which are represented by elements connected to switches 122 and 123. Switch 122 is illustrated in a configuration including a connection to repeater 130, and to a network interface card NIC in the end system 131. The repeater 130 is also connected to a set of end systems including end system 132 which includes a network interface card.

Switch 123 is connected to a repeater 133, which in turn is connected to a number of end systems including end system 134. Switch 123 is connected to a switch network 140 which is generically represented by a cloud in the diagram. Switch network 140 is coupled to a switch 141. Switch 141 is connected to a repeater 142, which in turn is connected to an end system 143 which includes a network interface card NIC.

In FIG. 2, nodes at which a security policy enforcement agent is located are coded by the horizontal bars. Thus, working from the upper left hand corner of the figure, modem 110, remote access router 112, terminal server 115, access server 106, line server 104, packet server 108, site router 107, site router 109, switch 122, switch 123, repeater 133, and the network interface cards at end systems 131 and 132 all include agents for enforcing security policy. The policy management station 126 includes the resources for providing a configuration interface, a topology data base, and a configuration driver back end as described above.

An overview of the devices in a typical network at which security policy can be enforced according to the present invention is provided below. Next, the overall process of the present invention is described with respect to FIGS. 3 through 6.

Network Interface Cards and Modems

The most basic products in the set of nodes are Network Interface Cards (NICs) and Modems. A NIC is an I/O device that attaches to an end system through its internal I/O bus, providing the end system access to a Local Area Network, such as Ethernet, Fast Ethernet, Gigabit Ethernet, Token Ring, FDDI, and ATM. In the case of ATM, certain NICs may provide access to an ATM Wide Area Network.

Modems are external devices that attach to end systems via serial or parallel interfaces. Generally, they allow the end system to use the PSTN or non-switched land lines for data movement.

Traditionally, NICs and Modems are simple devices, optimized for performance rather than features.

Perhaps the first NIC security feature to gain widespread acceptance is the NIC BootROM. Originally intended to allow diskless booting from network servers, a BootROM has the interesting security side effect of guaranteeing the execution of trusted boot code. With some supporting software this is used to load trusted code into the end system, which then configures the NIC for secure operation.

An increasingly popular feature with security implications is filtering. The use of filtering is motivated by several objectives. At the LAN level, filtering is used to protect NICs and Hubs from resource depletion problems arising from unconstrained broadcasting of frames. The structures developed to provide this type of filtering are known as VLANs. More general schemes that operate above layer 2 allow filtering across routers. These schemes are commonly known as VNETs.

The use of filtering for security purposes can occur in NICs, Switches, Repeaters, Routers, and Remote Access Equipment. Filtering within a NIC can be used to ensure the source MAC addresses it sends are valid and that the source addresses it receives are from trusted end systems. However, NIC filtering can be used for other equally valid purposes, such as offloading VLAN enforcement processing from Hubs, implementing pervasive multilayer firewalls, and providing hardware support for higher level security protocols.

One protected communications feature unique to NICs and modems is the high level of emanations security provided by certain physical communication channels. Specifically, the use of fiber optic lines reduces the threat of passive wiretap by an intruder.

Finally, many customers are becoming increasingly concerned that their internal networks are vulnerable to intruders gaining physical access to communication ports and end systems. For example, corporate intranets holding sensitive proprietary information are expanding over wide geographical areas with remote engineering and sales offices connected to them. These remove offices do not offer the same level of physical security that is found on the typical corporate campus.

Both NICs and modems can provide features that support network access control. Modems may require a user to provide a password, use a token card or otherwise provide proof that he is authorized to initiate a connection before performing the out-dialing sequence. Modems also may support callback functionality in Access Servers that only allow connections from authorized phone numbers.

The security policy backend establishes security rules in NICs by, for example, storing updated NIC boot code in an associated network server, and signaling the NIC to reboot. In modems, driver code is updated or configuration registers are written with new values by communication with modem management code.

Repeaters

Hubs are star network devices to which NICs connect in order to transmit frames to other end systems and provide connectivity at layer 2 of the protocol hierarchy. It is possible and common to build hierarchical networks by interconnecting Hubs to form a tree of interconnections.

Repeaters are Hubs that broadcast a frame they receive over all their lines (except the one on which it arrived). They are useful in building inexpensive interconnection fabrics. However, as the number of interconnected repeaters increases, interference between the connected end systems also increases. Therefore, the number of end systems that can be directly connected using repeaters is limited.

Repeaters are basic broadcast devices that generally keep features to a minimum in order to minimize costs. However, there are security features that are implemented in them.

Protected communications at layer 2 are a natural security issue that can be addressed, at least partially, by repeaters. Among other things, some repeaters garble the data in frames broadcast over segments to which the frame is not addressed. This ensures sniffers attached to those segments cannot view the data within these frames and yet guarantees the collision detection algorithms continue to work properly.

High-end repeaters could implement more sophisticated protected communication schemes, such as those defined in the IEEE 802.10 standard or others that are less complicated. Such schemes utilize cryptographic techniques to protect data carried by frames. Such protection would be useful in implementing system security features such as pervasive multilayer firewalls and network access control mechanisms as well as providing protection of end-system data.

Thus, the security policy backend establishes configuration data in a repeater by updating a neighboring management node, or management resources in the repeater itself.

Switches

Switches are hubs that examine source and destination addresses (and perhaps other information) in a frame to determine which of their lines they should use to forward a received frame. The advantage of a switch over a repeater is it reduces the traffic to end systems by sending frames only over those lines lying on a path to the destination. In the case of broadcast frames, switches may decide not to repeat them over certain lines based on policy information held within the switch.

Switches of varying capabilities and cost are manufactured, including ATM, Ethernet, Fast Ethernet, and Token Ring Switches. ATM switches are considerably more complicated than switches made for the other LAN types. Specifically, when ATM switches are interconnected, they move frames over virtual circuits the switches establish between end systems. This requires the movement of control information from the end system to the switch and between switches. This type of traffic is not required by switches of other access technologies.

All of the functions implemented by repeaters can also be implemented in switches (see previous section). In addition, a switch is an appropriate place to perform various filtering functions. Some switches are already capable of this in the form of VLAN support. In addition to providing security, VLANs reduce the amount of traffic flowing over a switch/repeater communications fabric by blocking the broadcast of frames over segments to which there is no VLAN member.

Filtering schemes traditionally make an admission decision based on various characteristics of the frame to which the filtering is applied. However, there are more sophisticated uses of filtering that transform the control and/or data in the frame. For example, implementation of a pervasive multilayer firewall might require the encapsulation of a frame within another protected frame, thereby implementing a layer 2 secure tunnel. Layer 2 tunnels are already implemented by ATM switches (LAN emulation) and by LAN traffic carrying ATM cells (CIF). The concept of a secure tunnel extends these schemes by protecting tunnel traffic as it transits the tunneling media. Another category of transformational filtering is layer 2 address translation, which might have utility in the implementation of a pervasive firewall.

Switches are a natural place to put head end network access control functionality, such as proxy interaction with authentication, authorization and audit (AAA) servers like RADIUS, TACACS+ and Netware NDS. In conjunction with repeaters they can monitor port disconnects and reconnects, reporting these to network management applications.

Switches are also convenient places to put security assist features. For example, they can implement system authentication protocols to ensure only trusted servers supply boot images to end systems. They can retain and distribute certain security infrastructure information, such as top-level certificates used in public key cryptography that contains the top-most public key in a certification hierarchy.

The security policy backend updates switch security constructs using the management communication channel, such as SNMP, implemented on the switch, or using application layer peer-to-peer communication protocols.

Routers

Routers are equipment that move packets between their interfaces in order to progress these packets between their source and destination. The routing decision is based usually on the source and destination network layer address of the packet as well as other information (e.g., the packet's quality of service, security option data and hop count). Routers are distinguished from switches by several characteristics, including: 1) they move data between interfaces connected to different access media, 2) they route based on information carried in the layer 3 packet rather than based on layer 2 control information and 3) they do not normally broadcast frames on all interfaces.

However, a recent trend in the networking industry is the integration of switching and routing in the same network device. A number of networking companies make switches that will translate between different access media frame formats, thus allowing them to move data between interfaces connected to different access technologies. Furthermore, layer 3 broadcast protocols, such as IP multicast, are becoming increasingly popular. Consequently, routers now perform broadcast functions that are very similar to switches. Thus, one remaining critical distinction between routers and switches seems to be where (i.e., the protocol layer) they get their information to perform the function.

In addition to this relaxation of the differences between routers and switches, products by several companies are coming to market that perform both routing and switching in the same equipment. Of special note in this regard is the router/switch of Ipsilon Networks of Sunnyvale, California, which routes IP packets, keeping track of traffic patterns. If the traffic between a particular source and destination reaches a specific threshold, the router sets up a cut-through layer 2 connection that allows packets between these systems to bypass the relatively expensive IP routing processing.

Routers provide many of the same security services that switches provide, but do so at layer 3 in the protocol hierarchy. There is a great deal of current activity defining layer 3 protected communications features. This activity is centered in the IPSEC working group of the IETF. IPSEC is a set of standards both promulgated and under development that specify how end systems and routers provide authentication, integrity and confidentiality services for the IP protocol. Such services can be used to provide both end-to-end protection as well as protection of tunnels between intermediate routers and between a router and an end-system.

The traditional filtering services provided by routers also allow them to act as components of a firewall. In general firewalls perform two functions, packet filtering at the network layer, the transport layer and the application layer, and application proxying. Routers generally only provide the first service. However, the trend in firewall technology is to provide state machines within the router that keep track of packets forwarded through it, such as FTP control traffic and TCP connection opening packets, and use this retained state to drive the filtering process. This feature blurs the distinction between packet filtering and application proxying.

The appropriate use of filtering allows customers to implement Virtual Networks (VNETs). VNETs are the layer 3 equivalent of VLANs. They separate traffic moved over the layer 3 communications fabric into separate domains. End systems and LAN segments that do not belong to a VNET do not see its traffic.

Communicating between the security policy backend and the router is typically peer-to-peer communication at an application layer. Of course, management channels, such as SNMP, may be used as well.

Remote Access Equipment

Remote access equipment converts communications sent over serial lines into routed traffic. Additionally, they support protocol surrogate processing, such as SPX keep-alive, local node emulation, etc.

End systems can be directly connected to remove access equipment (e.g., Terminal Servers) or through the Public Switch Telephone Network (PSTN). The more general situation is connection through the PSTN, which requires the use of Access Servers.

There are two major applications of Access Server equipment. The first is to provide remote access to private intranets. In such cases the Access Server is located within the private intranet, allowing remote access by stand-alone end systems and remote office routers through the PSTN. The second application of remote access products is within Internet Service Provider (ISP) networks. These give subscribers access to the ISP content equipment as well as the ISP's Internet connections. These two applications have somewhat different security requirements, which are discussed in more detail below.

The two functions of remote access equipment, line servicing and packet processing, are traditionally implemented within the same chassis. Recent changes in customer requirements, specifically the desire to use public WANs to implement Private Virtual Networks, has led vendors to separate these functions into two different products, the line server and the packet server. When customers use these products, the line server is connected on one side to the PSTN (or perhaps directly to end systems) and on the other side to a WAN. The packet server is connected on one side to a private intranet or ISP facility, and on the other side to the WAN. For each connection, the line server creates a protected tunnel through the WAN (normally using cryptographic technology) to the packet server. Connections to the line server may come either from stand-alone end systems or from remote office routing equipment.

Three remote access configurations are representative.

The first, WAN Access, is used by ISPs to provide access over the Public Switched Telephone Network (PSTN) to their internal resources and the Internet. An Access Server is connected to the PSTN, allowing clients with stand-alone end-systems to connect.

The second is the Remote Office Access configuration, which gives remote offices and telecommuters access to a private network. The Remote Access Router uses the PSTN to connect to an Access Server on the premises of a corporation or other organization. The Access Server then forwards the network traffic from the Remote Access Router into the Private Intranet.

The third configuration, Split Server Access, separates the Line Server and Packet Server functions into separate equipment. The Line Server handles serial line management and the data communications issues, while the Packet Server handles the interface between the WAN and the Private Intranet.

All three configurations require some sort of network access control. The WAN Access case authenticates and authorizes users before giving them access to the WAN. Those ISPs that also provide access to local resources (e.g., locally managed content, email services, Web pages) in addition to Internet access, also authenticate and authorize users before allowing them to use the local resources.

Remote Office Access needs to perform authentication and authorization of a remote office before allowing its traffic to flow through the Private Intranet. Since the router does not itself represent a user, authentication and authorization must occur during an initial connection sequence. Typically, this requires a user (acting in the role of a system administrator) to authenticate to the Remote Access Equipment, which after performing an authorization check opens a path into the Private Intranet.

Split Service Access may require two network access control decisions. The first allows a user access to the Line Server and the second allows him access to the Packet Server, and thus to the Private Intranet. In order to avoid burdening the user with a double login, network schemes used with Split Service Access may use access control resources managed by the Packet Server or the Private Intranet to admit users to the Line Server. In such cases, the Line Server and Packet Server/Private Intranet cooperate to grant the user admittance to both servers.

Another security service important to Remote Access is filtering. Access Servers (either in their integrated or split configurations) are natural points to place firewall functionality. This can take one of two forms. The simplest is to provide traditional firewall packet filtering in Access Servers and Packet Servers (in the Split Service Access case). Such filtering rules apply to all traffic transiting the equipment.

The more advanced form of filtering establishes filtering rules that apply on a per connection basis. That is, when a user establishes a connection through an Access Server, a set of filtering rules specific to that user are drawn from a filtering database. These rules are then installed into the Access Server, which applies them only to traffic traveling over that connection.

Finally, protected communications is an important service provided by Remote Access. This may occur in two places. In some situations, the physical security provided by the PSTN may be insufficient to provide appropriate guarantees to the user/Private Intranet. In such cases, the Modem/Remote Access Router may cryptographically protect its communications with the Access/Line Server. This requires cryptographic protocols that run over serial lines.

A more common case arises from the necessity of protecting communications over the WAN. In this situation the tunneling protocol used to move serial line traffic over the WAN is protected by cryptography. This may occur as the result of security support within the tunneling protocol or as the result of using security features provided by the network protocol used by the WAN. An important example of the latter is the use of IPSEC to protect communications of an IP WAN, thereby forming a Virtual Private Network.

Network Management

Virtually all of network intermediate systems and NICs must be configured or otherwise managed in some way. Generally, this is accomplished through the Simple Network Management Protocol (SNMP), which assumes each managed device implements agent functionality controlled by remote management software. Normally, multiple agents are managed by a given management station.

Network devices normally provide an SNMP agent that will respond to get and set requests from an SNMP manager which allow site administrators to manage networking equipment from an integrated systems perspective, rather than on a device by device basis.

One important characteristic of some network management systems is the provision of distributed remote monitoring (dRMON). Remote monitoring provides network managers with statistical and alarm information from "probes" that are connected to LAN equipment. As the number of LAN segments increases, however, the resources of probes are stressed beyond their capabilities, resulting in the delivery of incomplete information to the management station software. To address this problem, dRMON distributes some of the probe functionality in NICs and Hubs, which allows the remote monitoring functionality to scale as the size of the LAN grows.

Two network management problems are characterized by significant security issues. The first is network management security, that is, ensuring the network management subsystem is not subverted. An important issue is how to implement securely VLAN, VNET, or other group formation, which is an access control function. In general, part of this activity is centrally administered and part is left to a user's discretion. So, access control to group membership is a two step process. In the first step, a system administrator forms the group and establishes the policy by which users or systems may join it. In the second step, a user decides to join the group or decides to place a system in the group. The access control machinery then consults the policy data associated with the group and determines whether the proposed membership request is valid. Each step of this access control decision must be secure.

Other forms of network management security are controlling access to a Management Information Base (MIB), protected communication of sensitive network management data, such as captured packets, and providing access to network management stations.

The second important network management problem is security policy management. Each of the product categories described above have security features that require policy data for their correct and secure operation. Filtering rules for NICs Switches, Routers and Remote Access equipment are created, disseminated, modified and viewed. In even a moderate size network, these management functions become untenable unless there is coordinated control over the filtering data. This requires the use of a secure and robust security policy management system. Similar requirements exist for managing the security policy data associated with protected communications, access control and security assist features.

As the number of networking devices containing security policy data, such as filtering parameters, and protected communications infrastructure information increases, providing coherent and coordinated management of that security policy data becomes increasingly important. According to the present invention tools are provided by which an administrator is able to input security policy statements, and data corresponding to such statements is distributed to agents distributed in the network at which the policy is enforced.

Security policy data controlling various devices in a network interacts in a variety of ways. Thus, preferably the configuration interface provides an administrator with different views that are critical to correct management of the multiple layers of firewall functionality. For example, filtering data in a router might be displayed by source address, by TCP header information or by source/destination address pairs. Each view gives the administrator different information about which traffic is denied, allowed or transformed.

The configuration driver of the present invention maps high level security policy data describing the desired behavior into security policy individual individual network devices. Thus, the high level description policy statements are compiled into sets of low level configuration data. The configuration data is then distributed to the appropriate network devices using for example a Simple Network Management Protocol (SNMP) like protocol, Telnet, Trivial File Transfer Protocol (TFTP) or other device specific protocols. Thus, the network topology data base is important for the purposes of compiling and distributing configuration data according to the security policy statements that are provided at the configuration interface.

For simple networks, the system administrator may enter the topology information by hand. However, for most networks of any size, this is not a practical option. Consequently, traditional network management tools that maintain the required topology information can be utilized to compile topology data base information for use with the configuration driver of the present invention. The level of interaction required between the topology information gathered by the traditional network management tools, and the security policy enforcement strategies of the present invention depends on the sophistication of the multilayer firewall being implemented. For example, changes to the network topology may invalidate the mapping between high level security policy data and the security policy data distributed to the component devices. A sophisticated multilayer firewall is configured to receive notices from network management systems whenever a change in topology occurs, and to reconfigure the policy data and its component devices accordingly.

Finally, security policy management tools are protected so that intruders cannot use them to attack the network. This requires use of protected communications between the security policy configuration driver and the agents distributed in the network according to appropriate access control procedures.

Many components of the network support access control. However, not all components support the same kind of access control mechanisms. It is preferable to provide a common network access control functionality to as many devices as possible in the network. For example, widely deployed authentication, authorization, and accounting servers can be adapted to manage a wide variety of network devices. In addition, network operating systems, such as NetWare, provide some AAA services.

In addition, network devices are capable of sharing access control decisions according to the present invention. In a simple example, access control to a line server can be delegated to the packet server with which it is associated in a split access configuration. This not only ensures consistent behavior of the distributed remote access system, it also reduces its complexity and increases it reliability.

Traditional security doctrine mandates that protected communications be end to end. However, operational conditions sometimes make this less than optimal. For example, legacy equipment may not support end to end security protocols. Securing communications between these systems or between them and non-legacy systems requires non-intrusive protection mechanisms, such as routers or switchers that act as surrogates for the legacy systems. This approach is inherently not end to end.

Some equipment may be co-located in a common highly secure physical environment. In such environments, there is no benefit to end to end protection between equipment outside the perimeter and equipment inside it. To minimize costs, protection can terminate at the physical security boundary, eliminating the need to support expensive hardware and software on all interior systems.

Support of security protocols may require the use of expensive cryptographic hardware. In certain cases it is economically infeasible to put this hardware on all systems. This means the protected communications path must end at a system or device where implementing the cryptographic hardware somewhere before the ultimate destination of the data.

To accommodate these situations, it is necessary to protect communications by different means on constituent segments of the path between a source and destination. Some of the segments may use layer three protected communications, while others use layer two protection. Coordinating the protection given by each segment in a way that ensures adequate end to end security requires these segments to cooperate with one another. The present invention provides tools by which such cooperation can be managed.

FIG. 3 provides a flow chart of the process utilized to execute a multilayer firewall according to the present invention. As mentioned above, the nodes referred to in FIG. 3 can correspond to a wide variety of network devices, end systems and functions running in network devices and end systems operating at many protocol levels within the network.

As can be seen in FIG. 3, the first step is to determine a network topology and security rules (step 300). This information is provided by the configuration interface and topology data store in the system at FIG. 1.

Next, all of the active nodes and passive nodes in the network are identified. (step 301) For each active node, the passive nodes which are connected to it without intervening active nodes are identified (step 302). This defines the set of active nodes, along with associated passive nodes to be used in the compiling of the configuration data. For example, with reference to FIG. 2 active nodes include those nodes at which policy enforcement can be implemented. Passive nodes include nodes at which policy enforcement is not present, or not trusted. Thus passive nodes include the end system 143, the repeater 142, the switch 141, the switch network 140, the switch 124, the repeater 125, and other devices in the network.

For each security policy rule, the source and destination sets of end stations are identified (step 303). The source and destination sets may respectively comprise a single end station or a group of end stations. Next, the process determines whether the rule can be enforced (step 304). As mentioned above, this involves for example determining whether there is a path from any passive node in the source set to any passive node in the destination set that does not traverse an active node operating at a protocol layer in which the rule is to be implemented. If a connection between passive nodes in the source and destination sets is found, then that rule cannot be enforced. Thus, if the rule cannot be enforced, then the security process is notified (step 305) and the algorithm determines whether there are more rules to be compiled (step 306). If no more rules are left to be compiled, then the algorithm ends as indicated at step 307. If more rules exist in the security policy, then the algorithm loops back to step 303.

If at step 304, it is determined that the rule can be enforced with the identified active nodes in the set, then it is determined whether the rule is intended to be enforced at the source, at the destination or at both. If the rule specifies that it should be enforced at the source, then the active nodes which intervene between the nodes in the source set and those in the destination set are identified and the rule is translated to configuration data for the active nodes for which one of the source nodes is in their associated set and established at those nodes (step 310).

If the rule is to be enforced at the destination or both at the destination and at the source, then for each active node associated with a node in the destination set, the rule is translated into configuration data for that active node, and then established at that node (step 311).

After at least one of steps 310 and 311, the algorithm determines whether more rules exist to be translated (step 312). If there are no more rules, then the algorithm is finished (step 307). If more rules are left to be translated, then the algorithm loops back to step 303 to continue the process.

Once the source and destination sets are identified, the process of determining whether there is a path between passive nodes that does not require traversing an active node in order to reach a node in the destination set can be understood by considering private network 102 and stand alone routed end system 103 which are coupled to the WAN 100. Nodes in these network segments are incapable of enforcing policy or are not trusted to enforce policy. Thus, if a node in the private network 102 and the stand alone routed end system 103 reside in the source and destination sets of nodes, respectively, for a particular rule, then that rule cannot be enforced between those nodes. However, if node 103 and private network 102 are both in the source set of nodes for a particular rule, while all nodes in the private network 101 are in the destination set of a particular rule, then it is likely that the rule can be enforced, because in order to communicate between the source set and the destination set, all communications must traverse either the router 107, the packet server 108, or the router 109, all of which are capable of enforcing policy.

Figure 4:
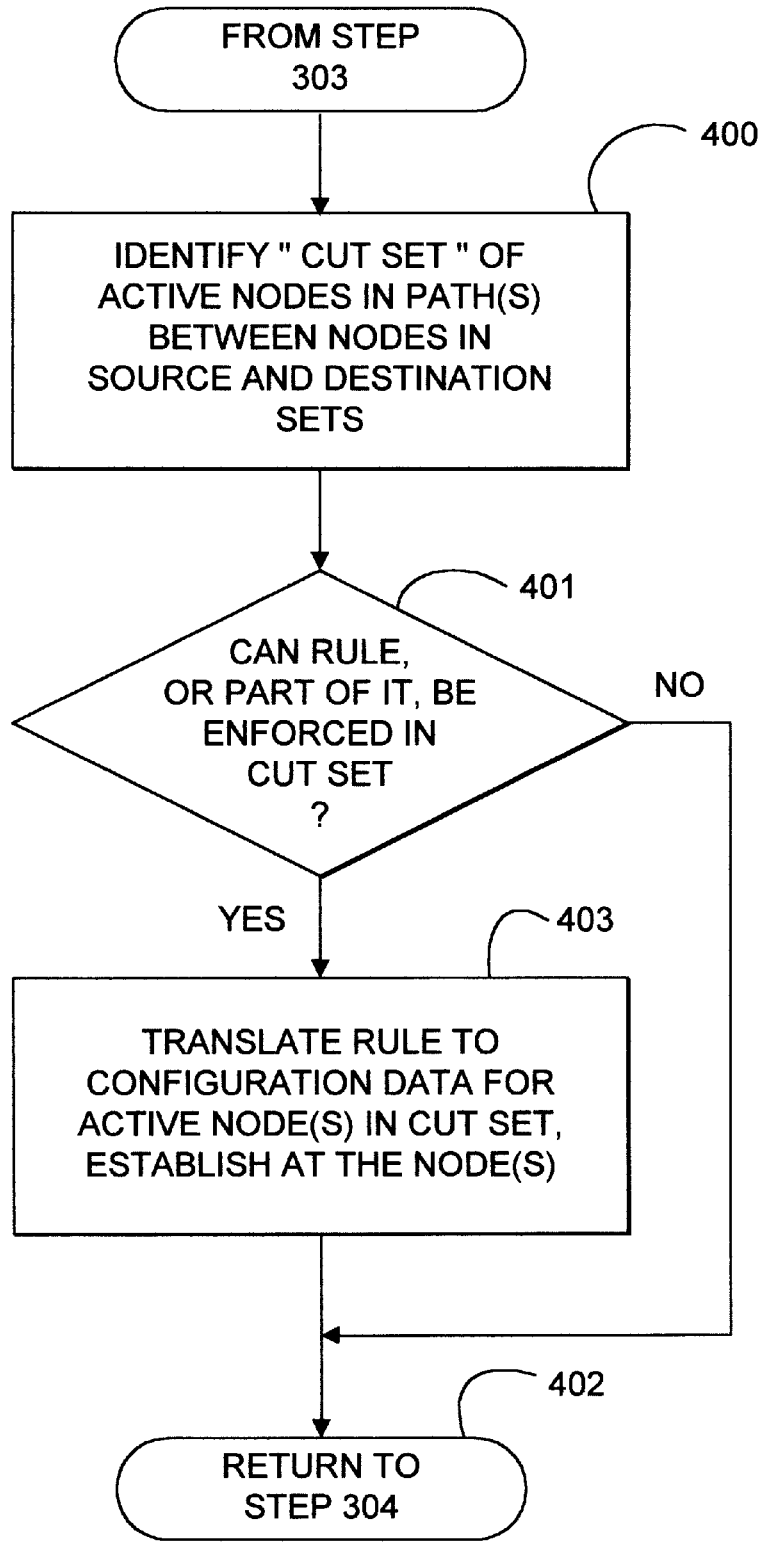
FIG. 4 is a flowchart illustrating an alternative technique for implementing multilayer firewall functionality according to the present invention.

FIG. 4 illustrates a process by which a multilayer firewall can be improved in some circumstances. For example, at step 303 of FIG. 3, the process branches to identify a "minimal cut vertex set" of active nodes in the path or paths between nodes in the source and destination sets (step 400). A cut vertex set consists of a set of active nodes which if removed would isolate the source and destination sets. A minimal cut vertex set is such a set having the smallest number of nodes for given source and destination sets. Thus, with reference to FIG. 2 for example if the source set includes the end stations 113, 114, 116 and 117, and the destination set is the stand alone routed end system 103, then the minimal cut vertex set of active nodes consists of the remote access router 112.

Because on each of the paths through the remote access router 112, there are fewer active nodes than are found in the active nodes associated with the source set (112 and 115) and in the active nodes associated with destination set (104 and 106), it is possible in some cases to implement a security policy at the minimal cut vertex set active nodes more efficiently, than in an implementation that distributes the security policy enforcement to all the active nodes in the source and destination sets. Thus, the algorithm next determines whether the rule can be enforced in the minimal cut vertex set of active nodes efficiently (step 401). If not, then the algorithm returns to step 304 of FIG. 3 as indicated by step 402. If the rule can be enforced in the minimal cut vertex set of active nodes, then the rule is translated to configuration data for the active nodes in the cut vertex set and established at such nodes (step 403). After step 403, the process returns to step 304 in the algorithm of FIG. 3.

Figure 5:
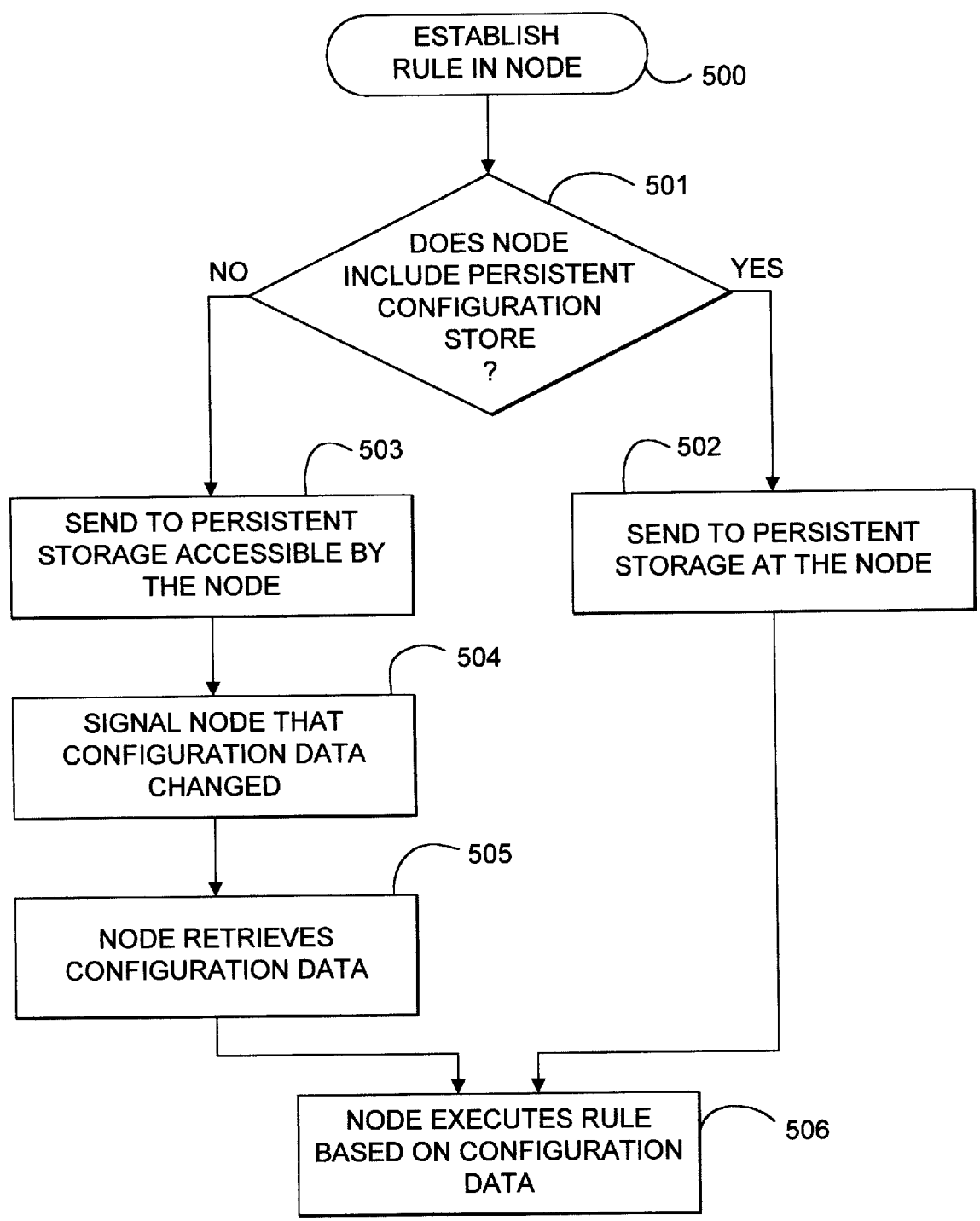
FIG. 5 is a flowchart illustrating steps involved in establishing configuration data at nodes in the network according to the multilayer firewall system of the present invention.

FIG. 5 illustrates a process for establishing the configuration data at the security policy agents distributed through the network.

In particular, the process of establishing a rule in a node involves transferring the configuration data to the node, storing it in persistent storage, and having the node recognize that the data has been updated so that it can begin to execute the new rule. However, not all security agents distributed in the network will be directly connected with persistent storage, such as a disk drive or a non-volatile flash memory device. For example, it is possible that a repeater 133 does not have persistent storage capability. However, the switch 123, or more preferably end station 126 which provides part of the policy management station, may have a disk drive or other persistent storage capability. In this scenario, it is possible to provide the configuration data to the switch 123, to the end station 126 or to another server in the network, and then to signal repeater 133 that the configuration data has been updated. A management agent associated with repeater 133 will then retrieve the configuration data from the switch 123 or end station 126 upon reboot, or during other processes at which the configuration data needs to be updated.

Accordingly, the process for establishing a rule in a node is illustrated in FIG. 5, beginning with the step 500. The process first determines whether the node subject of the configuration data includes persistent configuration store (step 501). If it does, then the configuration data is sent to persistent storage at the node (step 502). If the node does not include persistent storage, then the configuration data is sent to persistent storage at a node that is accessible by the node subject of the configuration data (step 503). Next, the node that is subject of the configuration data is signaled indicating a change (step 504). After receiving the signal that a change has occurred, the node retrieves the updated configuration data (step 505). After the configuration data has been provided to the node either through step 502 or step 505, the node executes the new rule based on the configuration data it has received (step 506).

Thus, the security policy management configuration driver establishes rules in nodes by communicating configuration data for these rules to them. For example, if the node has persistent storage, the security policy management configuration driver communicates the rules directly to the node using a standard protocol such as Telnet or Trivial File Transfer Protocol (TFTP), or it may use a protocol specifically designed for this purpose as part of the multilayer firewall. If the node does not have persistent storage, the security policy management configuration driver can communicate the rules to a persistent storage device accessible by the node, then signal the node using for example SNMP, or another protocol, informing the node that its security policy rules were updated. The node could then retrieve the new security policy rules from the persistent store. Furthermore, the security policy management configuration driver in alternative systems uses a distributed data base approach to update node policy. For example, the security policy management configuration driver can write data to a file or data base entry for which the node has a cached copy. The distributed data base cache coherency algorithm then notifies the node that its cached copy is no longer valid, motivating it to reread the master copy.

The algorithms discussed above for determining the rules to enforce at each active node are illustrative of capabilities of the multilayer firewall system of the present invention. Other algorithms are possible. For example, security policy statements can be decomposed in a specific security policy rule into parts enforced at different active nodes. This requires a path analysis between the nodes at the source set and those in the destination set, a determination of the semantics supported at each active node in this path, and implementation of various segments of the policy rule, or redundant versions of the policy rule at the active nodes in this set. Since sequential application of security policy rules in these active nodes may be able to implement the policy where it could not be implemented at the source, destination or cut vertex set active nodes, this approach of implementation of rules in a distributed fashion can provide a more effective firewall. Furthermore, decomposing the policy rule enforcement sequent sequential path of nodes can introduce efficiencies that are not possible through implementation in the source, destination or cut vertex set active nodes.

Figure 6:
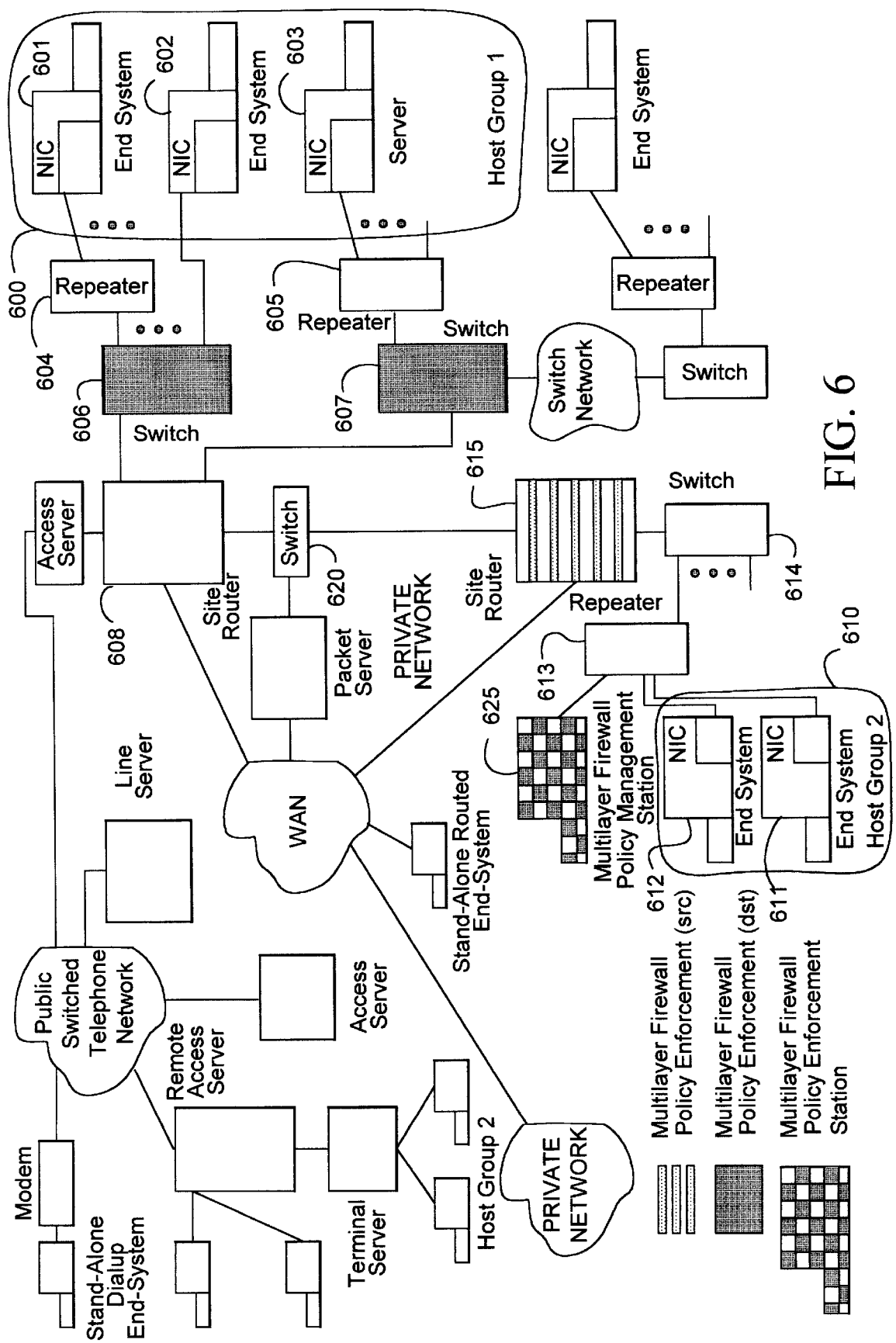
FIGS. 6 and 7 are versions of FIG. 2, highlighted for illustration of example security frameworks according to the present inventions.
Figure 7:
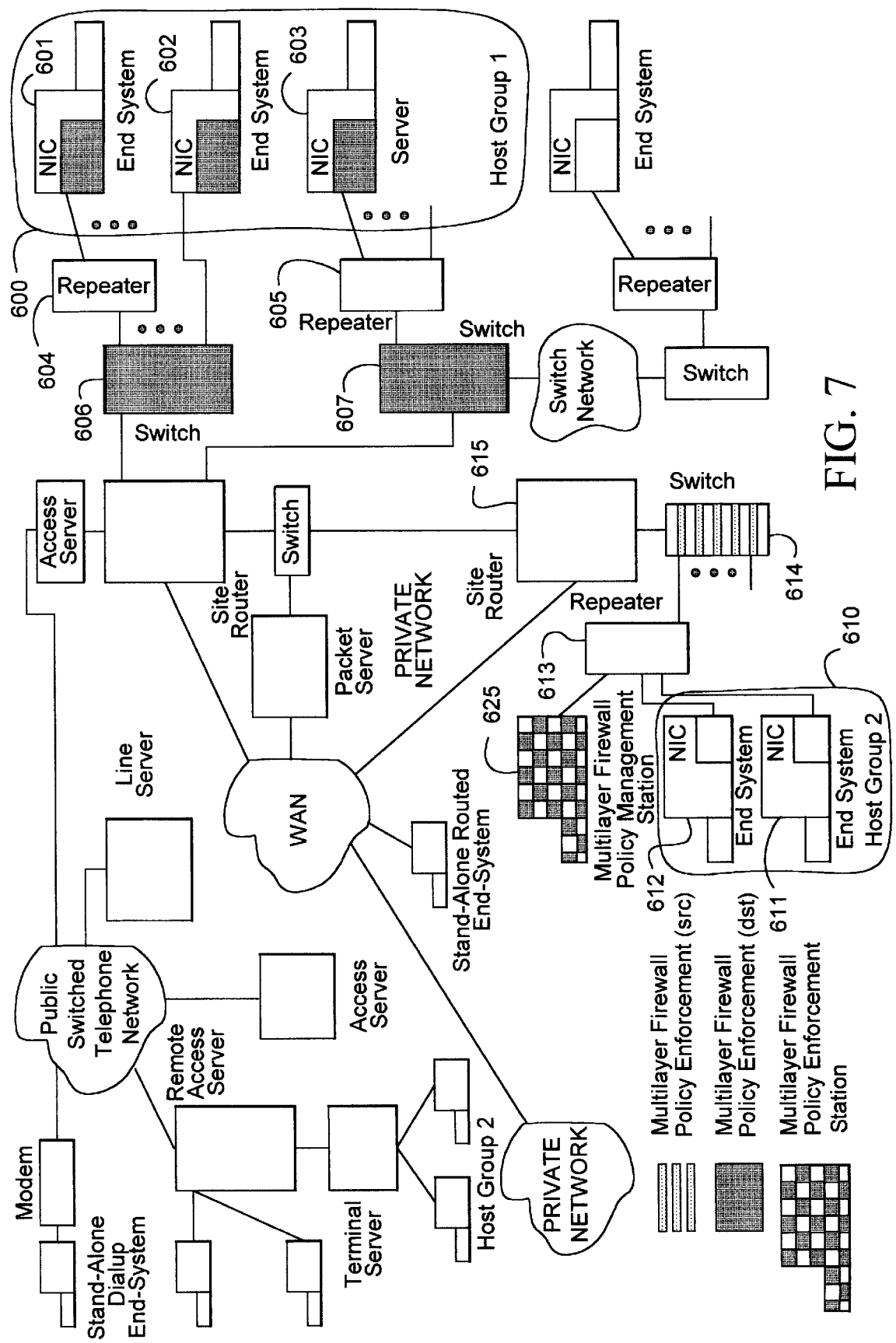

Two examples described with respect to FIGS. 6 and 7 (like FIG. 2), illustrate how the Multilayer Firewall works in practice. In FIGS. 6 and 7, Host Group One 600 consists of a large number of end systems 601, 602, 603, . . . connected through repeaters (604 and 605) and switches (606 and 607) to one of two site routers 608. Host Group Two 610 consists of two end systems (611 and 612) connected through a repeater 613 and switch 614 to the other site router 615. The two site routers are interconnected through a switch 620.

In both examples, the Multilayer Firewall is configured with one policy rule:

| Source | Destination | Activity | Policy Stmt. | Enforced At |
|---|---|---|---|---|
| Host Group Two | Host Group One | FTP | Allow | Both |

This rule is entered by a security administrator at the Multilayer Firewall Policy Management Station 625.

In the first example (FIG. 6), the two switches 606 and 607 are connected to Host Group One 600 through the repeaters 604 and 605, are capable of performing firewall rule enforcement and the site router 615 connected by a switch 614, and repeater 613 to Host Group Two 610 is also capable of performing firewall rule enforcement.

The Multilayer Firewall Policy Management Station 625 decomposes the Multilayer Firewall policy rule into two node specific policy rules, one for the site router 615 and one for the two switches 606 and 607 (it is assumed that both switches accept the same device specific policy rules). Since the "Enforced At" term specifies "Both", the Multilayer Firewall Policy Management Station 625 downloads the node specific policy rules to both the site router 615, using a protocol like TFTP, as well as the two switches 606 and 607, using a protocol like TFTP or a lower layer SNMP. If the "Enforced At" term had specified "Source", the Multilayer Firewall Policy Management Station 625 would only have downloaded the policy rule for the site router 615. If the "Enforced At" term had specified "Destination", the Multilayer Firewall Policy Management Station 625 would only have downloaded the policy rule for the switches 606 and 607.

The second example (FIG. 7) has the same network topology as the first. However, policy enforcement is achieved in a different way than in the first example. Specifically, both the switches connected through the repeaters 604 and 605 to Host Group One 600 end systems, as well as the NICS in these end systems, are capable of enforcing node specific policy rules. In addition, the switch 614 connected through the repeater 613 to Host Group Two 610 is capable of enforcing node specific policy rules, while the site router 615 is not.

The Multilayer Firewall Policy Management Station 625 decomposes the Multilayer Firewall policy rule into two node specific policy rules, one for the switch 614 connected through the repeater to Host Group Two 610, and one for the two switches 606 and 607 connected to Host Group One 600 (again, it is assumed that both of these switches accept the same device specific policy rules). Since the "Enforced At" term specifies "Both", the Multilayer Firewall Policy Management Station 625 downloads the node specific policy rules to both the Host Group Two 610 switch 614, as well as the two Host Group One 600 switches 606 and 607. If the "Enforced At" term had specified "Source", the Multilayer Firewall Policy Management Station 625 would only have downloaded the appropriate policy rule to the Host Group Two 610 switch 614. If the "Enforced At" term had specified "Destination", the Multilayer Firewall Policy Management Station would only have downloaded the appropriate policy rule to the Host Group One 600 switches 606 and 607.

This example also demonstrates one way NICs participate in the Multilayer Firewall. When each switch 606 and 607, associated with Host Group One 600 receives its node specific policy rule, it broadcasts the policy rule information to each end system 601, 602, and 603 in Host Group One 600 to which it is connected. For example, the node specific policy rule for Host Group One 600 switches 606 and 607 might be:

| Source | Destination | Activity | Policy Statement |
|---|---|---|---|
| Host 611 | Host 601 | FTP | Allow |
| Host 612 | Host 601 | FTP | Allow |
| Host 611 | Host 602 | FTP | Allow |
| Host 612 | Host 602 | FTP | Allow |
| * | * | * | * |
| * | * | * | * |
| * | * | * | * |

In this tabulation, each end system 611 and 612 in Host Group Two 610 is listed specifically as a source for each host in Host Group One 600 as a destination. In an actual implementation, a more efficient representation of these rules is possible by listing the subnet address associated with end systems in Host Group Two 610 and Host Group One 600.

When each NIC, such as the NIC at end system 601, receives these rules, it discards all of those node specific policy rules for which its end system (e.g., 601) is not a destination. It then uses the remaining rules to filter packets arriving at the end system (e.g., 601). In this example, the end systems 601, 602,and 603, with NICs enforcing node specific policy rules, would not be able to receive any traffic other than FTP requests from end systems 611 and 612 in Host Group Two 610.

The Host Group One 600 switches 606 and 607 also use these rules, but only for traffic coming from the end systems 601, 602, and 603 in Host Group One 600. Specifically, they drop all packets that are not FTP responses destined for end systems 611 and 612 in Host Group Two 610. These switches 606 and 607 discard any node specific rules specifying destination addresses for end systems to which they are not connected through the repeaters 604 and 605.

The advantage demonstrated in this example is that the NICs are responsible for enforcing the Multilayer firewall policy rule for inbound traffic, while the switches are responsible for enforcing it for outbound traffic. Dividing up the responsibility for this enforcement offloads some processing from the Host Group One 600 switches 606 and 607. It does this by relying on the NICs to protect their end systems against hostile traffic.

In both examples the Multilayer Firewall Management Station 625 communicates the device specific policy rules directly to the devices. This approach simplifies the discussion, but may introduce complexity into the Multilayer Firewall Management protocols. Other implementation strategies are possible and may be desirable. For example, instead of distributing the node specific policy rules directly to the devices, the Multilayer Firewall Management Station 625 could store them in a persistent store and then signal each device to retrieve their new policy. In the second example, the Host Group One 600 switches 606 and 607 might broadcast a message to the NICs at end systems 601, 602, and 603, informing them that they should retrieve their new policy from the persistent store instead of broadcasting the node specific policy to them directly.

The multilayer firewall functionality of the present invention is implemented as an object based management system in one embodiment, and with other programming techniques for the purposes of providing configuration of a distributed multilayer firewall in other embodiments.

The present invention provides a framework for providing coordinated multilayer, pervasive firewall in a network that consists of a wide variety of network devices and end systems. The system provides an easy to manage front end based on a configuration interface by which security policy rules are specified at a high level. These rules are then decomposed into actual configuration data for nodes in the network which are impacted by the rule. The configuration data is then established at the nodes in the network to implement the rule. By executing this process on a rule by rule basis, utilizing information about the topology of the network and the types of security functions being executed at the nodes in the network, a coordinated pervasive multilayer firewall system is provided. According to the present invention, role dissemination for diverse elements of a firewall is aggregated in one or more intelligent management system, preferably, implementing ease of use features, like graphic user interfaces and high level scripting.

The multilayer firewall of the present invention provides a security infrastructure for network systems of unprecedented flexibility. Furthermore, a coherent front end is provided that makes the complexity of managing many devices in a wide ranging network possible.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

We claim:

1. A system providing multiple protocol layer security in a network including nodes of a plurality of network device types, with nodes in a set of the nodes in the network including security functions executing in response to configuration data adapted for the corresponding type of node in the network, comprising:

a topology data store, storing information about security functions operating in the set of the nodes in the network, and about interconnection of nodes in the set of the nodes in the network;

a configuration interface, coupled to the topology data store, including an input by which to receive security policy statements indicating security policies to be implemented among nodes in the network; and a configuration driver, coupled to the network, the configuration interface, and the topology data store, including resources which translate the security policy statements into configuration data for the plurality of types of nodes in the network, and which conveys the configuration data to the nodes, wherein the security functions operating in the plurality of network device types across multiple protocol layers are coordinated by the security policy so that particular device types enforce the part of the security policy pertinent to the associated part of the network.

2. The system of claim 1, wherein the set of the nodes in the network includes nodes providing medium access control (MAC) layer filtering according to filter parameters, and the configuration data includes filter parameters for the MAC layer filtering.

3. The system of claim 1, wherein the set of the nodes in the network includes nodes providing network layer filtering according to filter parameters, and the configuration data includes filter parameters for the network layer filtering.

4. The system of claim 1, wherein the set of the nodes in the network includes nodes providing transport layer filtering according to filter parameters, and the configuration data includes filter parameters for the transport layer filtering.

5. The system of claim 1, wherein the set of the nodes in the network includes nodes providing application layer filtering according to filter parameters, and the configuration data includes filter parameters for the application layer filtering.

6. The system of claim 1, wherein the security functions include authentication protocols.

7. The system of claim 1, wherein the security functions include auditing.

8. The system of claim 1, wherein the security functions include authorization.

9. The system of claim 1, wherein the set of the nodes in the network includes nodes executing repeater functions, and the security functions include medium access control MAC layer filtering in the repeater functions.

10. The system of claim 1, wherein the set of the nodes in the network includes nodes executing data link layer switch functions, and the security functions include medium access control MAC layer filtering in the switch functions.

11. The system of claim 1, wherein the set of the nodes in the network includes nodes executing network layer routing functions, and the security functions include network layer filtering in the routing functions.

12. The system of claim 1, wherein the set of the nodes in the network includes nodes executing multiple protocol layer routing functions, and the security functions include authentication mechanisms.

13. The system of claim 1, wherein the set of the nodes in the network includes nodes executing network layer routing functions and nodes executing data link layer switch functions, and the security functions include medium access control MAC layer filtering and network layer filtering.

14. The system of claim 13, wherein the set of the nodes in the network includes nodes executing multiple protocol layer routing functions, and the security functions include authentication.

15. The system of claim 1, wherein the topology data store includes data indicating nodes coupled to network links to nodes external to the set of nodes in the network.

16. The system of claim 1, wherein the configuration interface includes a script interpreter which interprets a script language to determine the security policy statements.

17. The system of claim 16, wherein the script language includes a syntax for specifying a security policy statement including a source set identifier, a destination set identifier, a communication activity identifier, and a rule for the identified communication activity between the identified source set and the identified destination set.

18. The system of claim 17, wherein the syntax further includes an identifier of the location at which the rule is to be enforced.

19. The system of claim 1, including a configuration store having persistent storage capability in communication with a particular node in the set of the nodes in the network, and wherein the configuration driver transmits configuration data for the particular node to the configuration store.

20. The system of claim 19, wherein the configuration store is coupled with the particular node by a communication link.

21. A system providing security in a network including nodes of a plurality of types, nodes in a set of the nodes in the network including security functions executing in response to configuration data adapted for the corresponding type of node, comprising:

a topology data store, storing information about security functions operating in the set of the nodes in the network, and about interconnection of nodes in the set of the nodes, wherein the topology data store includes data indicating nodes coupled to network links to nodes external to the set of nodes, active nodes in the network capable of enforcing a security policy and passive nodes which are incapable of enforcing, or not trusted to enforce, a security policy; and wherein the security policy statements indicate security policies for active nodes, passive nodes, and for communications traversing network links to nodes external to the set of the nodes in the network;

a configuration interface, coupled to the topology data store, including an input by which to receive security policy statements indicating security policies to be implemented among nodes in the network; and a configuration driver, coupled to the network, the configuration interface, and the topology data store, including resources which translate the security policy statements into configuration data for the plurality of types of nodes in the network, and which conveys the configuration data to the nodes.

22. A system providing security in a network including nodes of a plurality of types, nodes in a set of the nodes in the network including security functions executing in response to configuration data adapted for the corresponding type of node, comprising:

a topology data store, storing information about security functions operating in the set of the nodes in the network, and about interconnection of nodes in the set of the nodes, wherein the topology data store includes data indicating active nodes capable for enforcing a security policy and passive nodes which are incapable of enforcing, or not trusted to enforce, a security policy;

a configuration interface, coupled to the topology data store, including an input by which to receive security policy statements indicating security policies to be implemented among nodes in the network; and a configuration driver, coupled to the network, the configuration interface, and the topology data store, including resources which translate the security policy statements into configuration data for the plurality of types of nodes in the network, and which conveys the configuration data to the nodes.

23. The system of claim 18, wherein the security policy statements indicate security policies for communication between a source set of one or more end stations and a destination set of one or more end stations.

24. The system of claim 22, wherein the configuration driver includes resources to enforce security policies for passive nodes by generating configuration data for active nodes linked to passive nodes.

25. A system providing security in a network including nodes of a plurality of types, nodes in a set of the nodes in the network including security functions executing in response to configuration data adapted for the corresponding type of node, comprising:

a topology data store, storing information about security functions operating in the set of the nodes in the network, and about interconnection of nodes in the set of the nodes;

a configuration interface, coupled to the topology data store, including an input by which to receive security policy statements indicating security policies to be implemented among nodes in the network, wherein the configuration interface includes a script interpreter which interprets a script language to determine the security policy statements, wherein the script language includes a syntax for specifying a security policy statement including a source set identifier, a destination identifier, a communication activity identifier, and a rule for the identified communication activity between the identified source set and the identified destination set; and a configuration driver, coupled to the network, the configuration interface, and the topology data store, including resources which translate the security policy statements into configuration data for the plurality configuration data to the network, and which conveys the configuration data to the nodes, wherein the configuration driver includes resources to identify security policy statements which cannot be enforced according to the data in the topology data store.

26. A system providing security in a network including nodes of a plurality of types, nodes in a set of the nodes in the network including security functions executing in response to configuration data adapted for the corresponding type of node, comprising:

a topology data store, storing information about security functions operating in the set of the nodes in the network, and about interconnection of nodes in the set of the nodes, wherein the topology data store includes data structures providing information for particular nodes, including network layer addresses, medium access control MAC layer addresses, user identifiers, whether or not the particular node is trusted to enforce security policy, the type of security policy it is able to enforce, and its connections to other nodes;

a configuration interface, coupled to the topology data store including an input by which to receive security policy statements indicating security policies to be implemented among nodes in the network; and a configuration driver, coupled to the network, the configuration interface, and the topology data store, including resources which translate the security policy statements into configuration data for the plurality of types of nodes in the network, and which conveys the configuration data to the nodes.

27. A system providing security in a network including nodes of a plurality of types, nodes in a set of the nodes in the network including security functions executing in response to configuration data adapted for the corresponding type of node, comprising:

a topology data store, storing information about security functions operating in the set of the nodes in the network, and about interconnection of nodes in the set of the nodes;

a configuration interface, coupled to the topology data store, including an input by which to receive security policy statements indicating security policies to be implemented among nodes in the network, wherein the security policy statements indicate security policies for communication between a source set including one or more end stations in the network, and a destination set including one or more end stations in the network, and wherein the configuration driver includes resources to identify a cut vertex set of nodes capable of enforcing the indicated security policies within the set of nodes in the network, and to establish the configuration data in the nodes in the cut vertex set; and a configuration driver, coupled to the network, the configuration interface, and the topology data store, including resources which translate the security policy statements into configuration data for the plurality of types of nodes in the network, and which conveys the configuration data to the nodes.

28. The system of claim 27, wherein said cut vertex set consists of a minimal cut vertex set.

29. A system providing security in a network including nodes of a plurality of types, nodes in a set of the nodes in the network including security functions executing in response to configuration data adapted for the corresponding type of node in the network, comprising:

a topology data store, storing information about security functions in the set of the nodes in the network, and about interconnection of nodes in the set of the nodes in the network, the topology data store including data structures providing information for particular nodes, including addresses at one or more protocol layers, whether or not the particular node is trusted to enforce security policy, the type of security policy the particular node is able to enforce, and connections of the particular node to other nodes;

a configuration interface, coupled to the topology data store, including an input by which to receive security policy statements indicating security policies to be implemented between source sets of one or more end stations and destination sets of one or more end stations in the network, including a script interpreter which interprets a script language to determine the security policy statements, and the script language includes a syntax for specifying a security policy statement including a source set identifier, a destination set identifier, a communication activity identifier, and a rule for the identified communication activity between the identified source set and the identified destination set; and a configuration driver, coupled to the network, the configuration interface, and the topology data store, including resources which translate the security policy statements into configuration data for various types of nodes in the network, and which send the configuration data to the nodes.

30. The system of claim 29, wherein the set of the nodes in the network includes nodes providing medium access control (MAC) layer filtering according to filter parameters, and the configuration data includes filter parameters for the MAC layer filtering.

31. The system of claim 29, wherein the set of the nodes in the network includes nodes providing network layer filtering according to filter parameters, and the configuration data includes filter parameters for the network layer filtering.

32. The system of claim 29, wherein the set of the nodes in the network includes nodes providing transport layer filtering according to filter parameters, and the configuration data includes filter parameters for the transport layer filtering.

33. The system of claim 29, wherein the set of the nodes in the network includes nodes providing application layer filtering according to filter parameters, and the configuration data includes filter parameters for the application layer filtering.

34. The system of claim 29, wherein the topology data store includes data indicating active nodes capable of enforcing a security policy and passive nodes which are incapable of enforcing, or not trusted to enforce, a security policy.

35. The system of claim 29, wherein the topology data store includes data indicating nodes in the network coupled to network links to nodes external to the set of nodes.

36. The system of claim 35, wherein the security policy statements indicate security policies for communications traversing network links to nodes external to the set of the nodes in the network.

37. The system of claim 29, wherein the syntax further includes an identifier of a location at which the rule is to be enforced.

38. The system of claim 29, wherein the configuration driver includes resources to identify security policy statements which cannot be enforced according to the data in the topology data store.

39. The system of claim 29, including a configuration store having persistent storage capability in communication with a particular node in the set of the nodes in the network, and wherein the configuration driver transmits configuration data for the particular node to the configuration store.

40. The system of claim 39, wherein the configuration store is coupled with the particular node by a communication link.

41. The system of claim 29, wherein the configuration driver includes resources to identify a cut vertex set of nodes capable of enforcing the indicated security policies, and to establish the configuration data in nodes in the cut vertex set.

42. The system of claim 41, wherein said cut vertex set consists of a minimal cut vertex set.

43. A method for establishing a firewall system in a network including a set of nodes of a plurality of types, nodes in the set of nodes in the network including security functions executing in response to configuration data adapted for the corresponding node, comprising:

providing topology data including information about security functions operating in nodes in the set, and about interconnection of nodes in the set, providing security policy statements indicating security policies to be implemented among end systems in the set;

translating, in response to the topology data, the security policy statements into configuration data for security functions operating at nodes in the set; and establishing the configuration data in the security functions at the nodes in the network;

wherein the topology data includes data structures providing information for particular nodes, including addresses at one or more protocol layers, whether or not the particular node is trusted to enforce security policy, the type of security policy the particular node is able to enforce, and connections of the particular node to other nodes.

44. The method of claim 43, wherein the step of providing the security policy statements includes interpreting a script language to determine the security policy statements, the script language including a syntax for specifying a security policy statement including a source identifier, a destination identifier, a communication activity identifier, and a rule for the identified communication activity between the identified source and the identified destination.

45. The method of claim 44, wherein the syntax further includes an identifier of the location at which the rule is to be enforced.

46. The method of claim 43, wherein the step of establishing includes transmitting the configuration data on the network to persistent storage in communication with the nodes.

47. The method of claim 46, wherein for at least one node, the persistent storage in communication with the node is local to the node, and for at least one other node the persistent storage in communication with the node is remote from the node.

48. The method of claim 46, wherein for at least one node, the persistent storage in communication with the node is remote from the node, and the step of establishing the configuration data at the node includes after transmitting the configuration data to the persistent storage, signaling the security function at the node that the configuration data has been changed.

49. The method of claim 43, wherein the topology data includes data indicating active nodes capable of enforcing a security policy and passive nodes which are incapable of enforcing, or not trusted to enforce, a security policy.

50. The method of claim 49, wherein the topology data includes data indicating nodes in the network coupled to network links to nodes external to the set of nodes in the network.

51. The method of claim 50, wherein the security policy statements indicate security policies for communications traversing network links to nodes external to the set of the nodes in the network.

52. The method of claim 49, wherein the step of translating includes, to enforce security policies for passive nodes, generating configuration data for active nodes linked to passive nodes.

53. The method of claim 43, wherein the step of translating includes identifying security policy statements which cannot be enforced according to the data in the topology data store.

54. The method of claim 43, wherein the set of the nodes in the network includes nodes providing MAC layer filtering according to filter parameters, and the configuration data includes filter parameters for the MAC layer filtering.

55. The method of claim 43, wherein the set of the nodes in the network includes nodes providing network layer filtering according to filter parameters, and the configuration data includes filter parameters for the network layer filtering.

56. The method of claim 43, wherein the set of the nodes in the network includes nodes providing transport layer filtering according to filter parameters, and the configuration data includes filter parameters for the transport layer filtering.

57. The method of claim 43, wherein the set of the nodes in the network includes nodes providing application layer filtering according to filter parameters, and the configuration data includes filter parameters for the application layer filtering.

58. The method of claim 43, wherein the security functions include authorization.

59. The method of claim 43, wherein the security functions include authentication.

60. The method of claim 43, wherein the security functions include auditing.

61. The method of claim 43, wherein the set of the nodes in the network includes nodes providing network layer filtering according to Internet Protocol (IP) filter parameters, and the configuration data includes IP filter parameters.

62. The method of claim 43, wherein the set of the nodes in the network includes nodes providing filtering according to Internet protocol and transport control protocol (TCP/IP) filter parameters, and the configuration data includes TCP/IP filter parameters.

63. A method for establishing a firewall system in a network including a set of nodes of a plurality of types, nodes in the set of nodes in the network including security functions executing in response to configuration data adapted for the corresponding type of node in the network, comprising:

providing topology data including information about security functions operating in nodes in the set, and about interconnection of nodes in the set;

providing security policy statements indicating security policies to be implemented between a source set of end stations and a destination set of end stations in the set;

identifying, in response to the topology data and the security policy statements, a cut vertex set of nodes consisting of nodes capable of enforcing the security policy statements, and which if removed from the network would isolate the source set from the destination set;

translating, in response to the identified cut vertex set and the security policy statements, into configuration data for security functions operating at nodes in the cut vertex set; and establishing the configuration data in the security functions at the nodes in the cut vertex set.

64. The method of claim 63, wherein the topology data includes data structures providing information for particular nodes, including addresses, whether or not the particular node is trusted to enforce security policy, the type of security policy the particular node is able to enforce, and connections of the particular node to other nodes.

65. The method of claim 63, wherein the step of providing the security policy statements includes interpreting a script language to determine the security policy statements, the script language including a syntax for specifying a security policy statement including a source identifier, a destination identifier, a communication activity identifier, and a rule for the identified communication activity between the identified source and the identified destination.

66. The method of claim 63, wherein the step of establishing includes transmitting the configuration data on the network to persistent storage in communication with the nodes in the cut vertex set.

67. The method of claim 66, wherein for at least one node, the persistent storage in communication with the node is local to the node, and for at least one other node the persistent storage in communication with the node is remote from the node.

68. The method of claim 63, wherein the set of the nodes in the network includes nodes providing network layer filtering according to Internet Protocol (IP) filter parameters, and the configuration data includes IP filter parameters.

69. The method of claim 63, wherein the set of the nodes in the network includes nodes providing filtering according to Internet protocol and transport control protocol (TCP/IP) filter parameters, and the configuration data includes TCP/IP filter parameters.

70. The method of claim 63, wherein said cut vertex set consists of a minimal cut vertex set.

\* \* \* \* \*